United States Patent
Li et al.

(10) Patent No.: US 9,256,003 B2
(45) Date of Patent: Feb. 9, 2016

(54) THREE-DIMENSIONAL FOCUSING INDUCED POLARIZATION EQUIPMENT FOR ADVANCED GEOLOGICAL PREDICTION OF WATER INRUSH DISASTER SOURCE IN UNDERGROUND ENGINEERING

(71) Applicant: SHANDONG UNIVERSITY, JiNan, ShanDong Province (CN)

(72) Inventors: Shucai Li, JiNan (CN); Bin Liu, JiNan (CN); Lichao Nie, JiNan (CN); Qingmei Sui, JiNan (CN); Jie Song, JiNan (CN); Tingyu Hao, JiNan (CN); Yuqiang Cao, JiNan (CN); Faye Zhang, JiNan (CN); Jing Wang, JiNan (CN); Zhengyu Liu, JiNan (CN); Huaifeng Sun, JiNan (CN)

(73) Assignee: SHAN DONG UNIVERSITY, Jinan (CN)

( * ) Notice: Subject to any disclaimer, the term of this patent is extended or adjusted under 35 U.S.C. 154(b) by 208 days.

(21) Appl. No.: 14/235,332

(22) PCT Filed: Jan. 17, 2013

(86) PCT No.: PCT/CN2013/000042
§ 371 (c)(1),
(2) Date: Jan. 27, 2014

(87) PCT Pub. No.: WO2014/110689
PCT Pub. Date: Jul. 24, 2014

(65) Prior Publication Data
US 2015/0077119 A1   Mar. 19, 2015

(30) Foreign Application Priority Data

Jan. 15, 2013 (CN) .......................... 2013 1 0013435
Jan. 15, 2013 (CN) ....................... 2013 2 0018465 U

(51) Int. Cl.
*G01V 3/06* (2006.01)
*G01V 3/24* (2006.01)
(Continued)

(52) U.S. Cl.
CPC ................ *G01V 3/083* (2013.01); *E21B 49/08* (2013.01); *G01V 3/04* (2013.01)

(58) Field of Classification Search
CPC ........... G01V 3/06; G01V 3/24; G01V 3/265; G01V 1/201; G01V 2003/085; G01V 9/02; G01V 1/38

USPC .................. 324/324, 329, 336, 347, 357, 365
See application file for complete search history.

(56) References Cited

U.S. PATENT DOCUMENTS 4,295,096 A * 10/1981 Sternberg ................. G01V 3/06
                                                                  324/357
4,642,570 A    2/1987 Sternberg et al.
(Continued)

FOREIGN PATENT DOCUMENTS

CN         1904644 A      1/2007
CN       101561513 A     10/2009
(Continued)

OTHER PUBLICATIONS

Li et al; "Data-collecting system for resistivity tomography;" Progress in Geophysics; Dec. 2004; vol. 19; No. 4: pp. 812-817 (with English Abstract).
(Continued)

*Primary Examiner* — Tung X Nguyen
*Assistant Examiner* — Neel Shah
(74) *Attorney, Agent, or Firm* — Oliff PLC

(57) ABSTRACT

The invention discloses three-dimensional focusing induced polarization equipment for advance geological prediction of a water inrush disaster source in underground engineering, comprising a constant-current multiplex transmitter, an intelligent multichannel receiver, an automatic multi-electrode switch, an industrial personal computer, an observation electrode array and shielding electrodes, wherein electrodes in the observation electrode array are respectively used as a source electrode and observation electrodes; the industrial personal computer controls the constant-current multiplex transmitter to transmit currents of the same polarity to the shielding electrodes and the source electrode, so that the currents of the source electrodes are nearly directed straight ahead of a driving face under the action of the shielding electrodes; the observation electrodes are used for scanning data acquisition, and the data are fed back to the industrial personal computer through the intelligent multi-channel receiver; and the industrial personal computer controls the automatic multi-electrode switch to change the source electrode.

7 Claims, 5 Drawing Sheets

(51) Int. Cl.
 *G01V 3/08* (2006.01)
 *G01V 3/04* (2006.01)
 *E21B 49/08* (2006.01)

(56) References Cited

U.S. PATENT DOCUMENTS

| | | | |
|---|---|---|---|
| 2005/0093548 A1* | 5/2005 | Ueda | G01V 3/06 |
| | | | 324/357 |
| 2005/0280419 A1 | 12/2005 | Chen et al. | |
| 2014/0254317 A1* | 9/2014 | Thompson | G01V 1/36 |
| | | | 367/21 |

FOREIGN PATENT DOCUMENTS

| | | |
|---|---|---|
| CN | 201508417 U | 6/2010 |
| CN | 201909852 U | 7/2011 |
| CN | 102176059 A | 9/2011 |
| CN | 102508303 A | 6/2012 |
| CN | 202649483 U | 1/2013 |

OTHER PUBLICATIONS

Nie et al; "An advanced detection study of frequency domain induced polarization method for water-bearing structure of tunnel;" Rock and Soil Mechanics; Apr. 2012; vol. 33; No. 4; pp. 1151-1160 (with English Abstract).

Li et al; "Study of Advanced Detection for Tunnel Water-Bearing Geological Structures with Induced Polarization Method;" Chinese Journal of Rock Mechanics and Engineering; Jul. 2011; vol. 30; No. 7; pp. 1297-1309 (with English Abstract).

Oct. 24, 2013 Search Report issued in International Patent Application No. PCT/CN2013/000042 (with translation).

Oct. 24, 2013 Written Opinion issued in International Patent Application No. PCT/CN2013/000042 (with translation).

* cited by examiner

THREE-DIMENSIONAL FOCUSING INDUCED POLARIZATION EQUIPMENT FOR ADVANCED GEOLOGICAL PREDICTION OF WATER INRUSH DISASTER SOURCE IN UNDERGROUND ENGINEERING

FIELD OF THE INVENTION

The present invention relates to an advanced geological prediction system of a water inrush disaster source based on a three-dimensional focusing induced polarization method in tunnel and underground engineering constructions, in particular to a three-dimensional focusing induced polarization instrument for advanced geological prediction of a water inrush disaster source in an underground engineering construction period.

BACKGROUND OF THE INVENTION

China is one of the nations suffering most serious water inrush disasters in tunnel and underground engineering, casualties and economic losses caused by water inrush and mud inrush disasters are in the forefront of geological disasters of various tunnel and underground engineering, and heavy casualties and severe economic losses and environmental disruption are generally caused. In order to prevent the water inrush and mud inrush disasters in tunnel and underground engineering, advanced geological prediction work needs to be implemented in the construction period, and the purpose of the advanced geological prediction work is to explore the geological conditions within a certain range in front of the excavation surface of tunnel and underground engineering. However, due to the strong imperceptibility and complexity of the water inrush and mud inrush disaster sources, no effective method or instrument is available for three-dimensional location of the water inrush disaster sources and quantitative prediction of the water quantity, and it is a key problem to be solved urgently in the engineering field of tunnel and underground engineering at home and abroad.

Since 70's in last century, advanced prediction research work on unfavorable geology in a construction period of tunnel and underground engineering has been begun internationally, and multiple geophysical exploration methods have been developed after development of nearly 40 years, for example, seismic reflection method, electrical method, electromagnetic method, etc. For the advanced geological prediction of a water inrush disaster source, a seismic reflection advanced prediction method and equipment thereof (for example, TSP method, TRT method, and the like) are insensitive to response of a water body and can not effectively recognize and locate the water inrush disaster source. An electromagnetic advanced prediction method and equipment thereof (for example, geological radar method, transient electromagnetic method, and so on) are sensitive to spatial position information of the water body and have a certain effect of locating the water body, yet, the electromagnetic method is very weak in anti-interference ability and is unable to predict the water quantity.

In electrical method type geological prediction methods, an induced polarization method is relatively effective, the induced polarization method is proved to have good reaction to the spatial position and water quantity of the water body and provide an effective and feasible way to solve the problems on the three-dimensional location and water quantity prediction in advanced prediction of water inrush disaster sources in underground engineering construction such as tunneling and the like. However, the existing advanced exploration induced polarization equipment in tunnel and underground engineering is fixed point source non-focusing type induced polarization equipment based on an electrical sounding theory. An exploration line of the non-focusing type induced polarization advanced prediction equipment is arranged on a tunnel side wall or bottom plate, and side interference near the exploration line generally covers useful information in front of the tunnel excavation surface, so that the location and water quantity prediction precision on the water inrush disaster source is low and the credibility is poor, thereby often resulting in a wrong geological exploration result to affect the tunnel construction safety.

The following key problems exist in the invention of the three-dimensional focusing type induced polarization equipment: (1) a shielding electrode and a source electrode need to simultaneously output current of the same polarity, and the invention of a multiplex large-constant-current transmitter with an automatic modulation function is the key problem; (2) in a three-dimensional focusing type induced polarization exploration method, an observation electrode system composed of tens of electrodes needs to be arranged on the excavation surface, and an automatic multichannel observation data collection device, namely an intelligent multichannel receiver, needs to be developed; (3) a large number of data of the observation electrode array need to be measured by the equipment, the electrodes need to be continuously switched in the collection process, and meanwhile, the switch of large current is a problem to be solved urgently, and an automatic electrode converter needs to be developed; (4) the equipment needs to have a comprehensive collection function of multi-element induced polarization information, including shielding current, supply current, apparent resistivity, ground resistance, apparent polarizability, induced polarization decay time, etc.

SUMMARY OF THE INVENTION

In order to solve the problems of non-focusing type induced polarization equipment, the present invention aims to provide three-dimensional focusing induced polarization equipment for advanced geological prediction of a water inrush disaster source in underground engineering, the equipment is stable in performance, high in sensitivity, convenient and practical, can realize mass production, and can prediction the lithology change and aquifer properties in front of a tunnel face in the tunnel and underground engineering.

In order to achieve the abovementioned purpose, the following technical scheme is adopted in the present invention.

Three-dimensional focusing induced polarization equipment for advanced geological prediction of a water inrush disaster source in underground engineering comprises a constant-current multiplex transmitter, an intelligent multichannel receiver, an automatic multi-electrode switch, an industrial personal computer and an electrode system; the electrode system comprises an observation electrode array and shielding electrodes; the observation electrode array comprises a plurality of electrodes, the electrodes in the observation electrode array and the shielding electrodes are respectively connected with the automatic multi-electrode switch, the automatic multi-electrode switch is respectively connected with the constant-current multiplex transmitter and the intelligent multichannel receiver, and the constant-current multiplex transmitter, the intelligent multichannel receiver and the automatic multi-electrode switch respectively communicate with the industrial personal computer. In the present invention, the observation electrode array and the shielding electrodes are arranged on a tunnel excavation surface, any electrode in the observation electrode array is selected as a source electrode, the other electrodes are used as observation electrodes, the industrial personal computer controls the constant-current multiplex transmitter to transmit current of the same polarity to the shielding electrodes and the source electrode, so that the current of the source electrode is nearly directed straight ahead of the excavation surface under the action of the shielding electrodes, and no side interference exists; the observation electrodes are used for collecting scanning data and feeding back the scanning data to the industrial personal computer through the intelligent multichannel receiver; and after measuring the cycle, the industrial personal computer controls the automatic multi-electrode switch to change the source electrode to perform the next cycle of measurement to obtain a large number of data carrying effective information in front of the excavation surface so as to realize three-dimensional location and water quantity prediction of the water inrush danger source, so that the problems of the non-focusing type induced polarization equipment are solved.

The constant-current multiplex transmitter comprises a transmission singlechip system, an inverter circuit, a multiplex driving module, a boosting module, a rectifying module, a current and voltage sampling module and a data collecting module. A power supply generates high-voltage constant current through the inverter circuit, the boosting module and the rectifying module, and the rectifying module is connected with the multiplex driving module; and the transmission singlechip system controls the inverter circuit, the boosting module and the multiplex driving module to detect current in a feedback circuit through the current and voltage sampling module and controls the multiplex driving module to output multiplex adjustable constant current.

The transmission singlechip system comprises a transmission singlechip, a digital display module, a clock module, a data storage module and a data communication module, the transmission singlechip system mainly performs detection, display and control on switching value and analog quantity, the transmission singlechip and a peripheral circuit power supply and constant current source are designed to be completely isolated, parameters are set by a keyboard and are displayed on the digital display module, the transmission singlechip system outputs two paths of PWM modulation waveforms through a timer comparison output function of the transmission singlechip and controls the inverter circuit to invert DC voltage through pulse width modulation (PWM) technology; the current and voltage sampling module detects the current passing by the rectifying module, the transmission singlechip adjusts the boosting circuit to satisfy that the current passing by the rectifying module is constant, meanwhile, the current and voltage sampling module detects each path of current output by the multiplex driving module, and the transmission singlechip controls the multiplex driving module so as to adjust each path of current of the multiplex driving module to achieve a stable set value.

The multiplex driving module generates high voltage from the DC voltage through the inverter circuit and the boosting module and forms a multiplex negative feedback constant-current output loop through high-power MOSFET tubes so as to output multiplex constant large current, and meanwhile, the current and voltage sampling module feeds back the current size of each path, so that the transmission singlechip adjusts the multiplex driving module to output the number of the set power supply paths, power supply time and current size.

One end of the current and voltage sampling module is used for respectively detecting current passing by the rectifying module and multiplex current generated by the multiplex driving module, and the other end of the current and voltage sampling module is connected with the transmission singlechip through the data collecting module. The current and voltage sampling module is subjected to analog isolation by a Hall detecting circuit.

The transmission singlechip system further comprises an overvoltage and overcurrent protection module, the overvoltage and overcurrent protection module is respectively connected with the current and voltage sampling module and the transmission singlechip, the current and voltage sampling module feeds back the current size to the current and voltage protection module to achieve automatic protection on each branch of output voltage in multiplex output.

The intelligent multichannel receiver comprises multiple parallel receiving modules, multichannel ADC converters and receiving singlechips, which are connected in sequence, and a receiving signal enters the receiving singlechips after passing by the receiving modules and the ADC converters in sequence; the receiving singlechips collect the data of each receiving module and realize control and information feedback with the industrial personal computer through communication so as to perform final processing on digital signals and measure the apparent resistivity, ground resistance, apparent polarizability, half-decay time and rate of induced polarization.

The receiving module comprises an electrostatic high-voltage suppression circuit, a common mode suppression circuit, a differential mode suppression circuit, a first-stage 50 Hz trapper, a differential input amplifier, a second-stage 50 Hz trapper, a 100 Hz trapper and an 8-order Butterworth 20 Hz low pass filter, which are connected in sequence, and meanwhile, the receiving singlechip controls the differential input amplifier through a DAC zeroing circuit.

The electrostatic high-voltage suppression circuit mainly absorbs static and surge shocks in the working environment to protect a rear end circuit; the common mode suppression circuit and the differential mode suppression circuit absorb input common mode and differential mode interference signals, two stages of 50 Hz trappers primarily absorb 50 Hz power frequency interference to ensure that the DC working point of the differential input amplifier does not drift with the interference signals; signals output by the differential input amplifier pass by the first-stage 50 Hz trapper and the 100 Hz trapper to fully suppress the interference of power frequency and power frequency harmonic waves; and the 8-order Butterworth low pass filter has a decrement of 40 dB each decade and ensures the smoothness of signals in the bandwidth.

The automatic multi-electrode switch comprises a multiplex relay switch, a decoding circuit, a converter singlechip, a communication module and a voltage sampling circuit, the industrial personal computer is connected with the converter singlechip through the communication module, the converter singlechip is connected with the multiplex relay switch through the decoding circuit, one end of the multiplex relay switch is connected with the electrode system, and the other end of the multiplex relay switch is connected with the constant-current multiplex transmitter and the intelligent multichannel receiver through multiplex cables to perform conversion of four arrangements of Winner, dipole, differential and combined section, and only one second is needed to change the measuring point one time, thereby greatly saving manpower, material resources and time and improving the measuring precision and efficiency.

The multiplex relay switch is a high-power relay, meanwhile, the voltage sampling circuit is used for detecting the voltage of the high-power relay, and the voltage is fed back to the industrial personal computer through the converter singlechip so as to quickly switch the large transmission current to avoid burning of the relay due to over large load. The converter singlechip controls the on/off of the multiplex relay switch through an encoding circuit according to a command sent by the industrial personal computer to realize quick conversion of multiple electrodes.

The industrial personal computer comprises a signal recognition module, a signal processing module and a terminal display control module, the industrial personal computer is connected with the constant-current multiplex transmitter through communication, realizes control and information feedback through communication, is connected with the automatic multi-electrode switch through communication, can set the parameters of the automatic multi-electrode switch, the constant-current multiplex transmitter and the intelligent multichannel receiver, meanwhile, sends a control command on branch number and current size of each branch to the intelligent multichannel receiver and the constant-current multiplex transmitter to detect the voltage fed back by the automatic multi-electrode switch, processes a multiplex signal passing by the intelligent multichannel receiver, and processes the digital signals and displays on a terminal.

The actual application process of the present invention is simple to operate:

1. The instrument is connected. An electrode cable is connected to the automatic multi-electrode switch, and the automatic multi-electrode switch is connected with the multiplex output end of the constant-current multiplex transmitter and the multiplex receiving end of the intelligent multichannel receiver through cables.
2. The receiver is started. A power supply is connected, the switches of the transmitter and the receiver are turned on, control software is started and a port is opened.
3. Parameters are set. The power supply path, current size, power supply time, receiving path of the intelligent multichannel receiver, sampling time and interval and the parameters of the automatic multi-electrode switch are set.
4. The instrument is checked. The ground resistance is measured, the contact condition between the electrode and a measured region is checked, and the connection conditions of the constant-current multiplex transmitter, the intelligent multichannel receiver and the automatic multi-electrode switch are detected.
5. Instrument measurement is performed. A zeroing push button is pushed to begin a zeroing operation and the zeroing operation is stopped after a voltage curve in a curve display window is at the zero point. A measurement beginning push button is pushed to transmit current to begin the measurement, and a sampling stop push button is pushed to stop the current sampling and stop current transmission.
6. Data are stored and the program is quitted. A data storage push button is pushed to store the curve and a sampling value, and meanwhile, the collection program is quitted.

The beneficial effects of the present invention are as follows:

1. The high-power high-precision multiplex driving module is adopted in the present invention to realize the multiplex large-constant-current transmitter with an automatic modulation function to output 6 paths of large constant current, so that the shielding electrodes and the source electrode can simultaneously output current of the same polarity with adjustable size, the current output is 0-2.0 A, and the step length is 0.01 A.
2. 8 parallel receiving modules and three multichannel 24-bit ADC converters can be adopted in the present invention to realize the intelligent multichannel receiver of multichannel observation data so as to synchronously measure 8 channels of observation data, thereby greatly improving the collection efficiency and meeting the requirements of the three-dimensional focusing type induced polarization exploration method for exploring large data size.
3. A multi-electrode conversion device is adopted in the present invention, the device realizes automatic conversion of the electrodes, and a high-power relay and a feedback circuit are adopted to realize automatic switch of large current and automatic collection of focusing induced polarization exploration according to a preset sequence, thereby improving the collection efficiency and providing hardware support for quick three-dimensional focusing induced polarization exploration.
4. A hardware system of a focusing induced polarization instrument is realized in the present invention, the hardware system can comprehensively collect multi-element information such as apparent resistivity, ground resistance, apparent polarizability, half-decay time, rate of induced polarization and the like, the current directivity is good, and directional advanced prediction of the tunnel face is realized to effectively reduce the interference information behind the tunnel face and improve the exploration precision and accuracy. The urgent demand of controlling the geological disasters in the national key engineering construction at present can be satisfied, so that considerable economic benefits and social benefits will be brought.

Wherein, 1 represents the large-constant-current multiplex transmitter, 2 represents the intelligent multichannel receiver, 3 represents the automatic multi-electrode switch, 4 represents the industrial personal computer, 5 represents the electrode system, 6 represents the H-bridge inverter circuit, 7 represents the boosting module, 8 represents the rectifying module, 9 represents the high-power high-precision multiplex driving module, 10 represents the current and voltage sampling module, 11 represents the overvoltage and overcurrent protection module, 12 represents the data collecting module, 13 represents the transmission singlechip, 14 represents the digital display module, 15 represents the clock module, 16 represents the data storage module, 17 represents the data communication module, 18 represents the receiving module, 19 represents the ADC converter, 20 represents the receiving singlechip, 21 represents the multiplex relay switch, 22 represents the decoding circuit, 23 represents the converter singlechip, 24 represents the communication module, and 25 represents the voltage sampling circuit.

DETAILED DESCRIPTION OF THE EMBODIMENTS

A further illustration is made below on the present invention in combination with drawings and embodiments.

Figure 1:
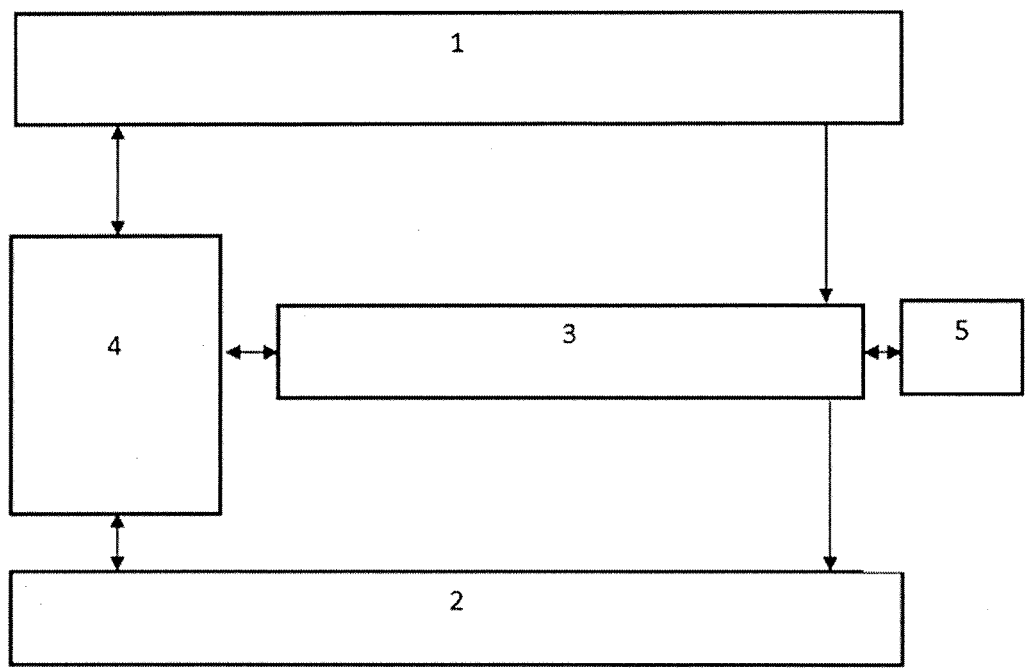
FIG. 1 is a schematic structural diagram of the present invention.

As shown in FIG. 1, three-dimensional focusing induced polarization equipment for advanced geological prediction of a water inrush disaster source in underground engineering comprises a large-constant-current multiplex transmitter 1, an intelligent multichannel receiver 2, an automatic multi-electrode switch 3, an industrial personal computer 4 and an electrode system 5; the electrode system 5 comprises an observation electrode array and shielding electrodes; the observation electrode array comprises a plurality of electrodes, the electrodes in the observation electrode array and the shielding electrodes are respectively connected with the automatic multi-electrode switch 3, the electrode system 5 comprises 36 paths of electrodes, the automatic multi-electrode switch 3 is respectively connected with the large-constant-current multiplex transmitter 1 and the intelligent multichannel receiver 2, and the large-constant-current multiplex transmitter 1, the intelligent multichannel receiver 2 and the automatic multi-electrode switch 3 respectively communicate with the industrial personal computer 4. In the present invention, the observation electrode array and the shielding electrodes are arranged on a tunnel excavation surface, any electrode in the observation electrode array is selected as a source electrode, the other electrodes are used as observation electrodes, the industrial personal computer 4 controls the large-constant-current multiplex transmitter 1 to transmit current of the same polarity to the shielding electrodes and the source electrode, so that the current of the source electrode is nearly directed straight ahead of the excavation surface under the action of the shielding electrodes, and no side interference exists; the observation electrodes are used for collecting scanning data and feeding back the scanning data to the industrial personal computer 4 through the intelligent multichannel receiver 2; and after measuring the cycle, the industrial personal computer 4 controls the automatic multi-electrode switch 3 to change the source electrode to perform the next cycle of measurement to obtain a large number of data carrying effective information in front of the excavation surface so as to realize three-dimensional location and water quantity prediction of the water inrush danger source, so that the problems of the non-focusing type induced polarization equipment are solved.

Figure 2:
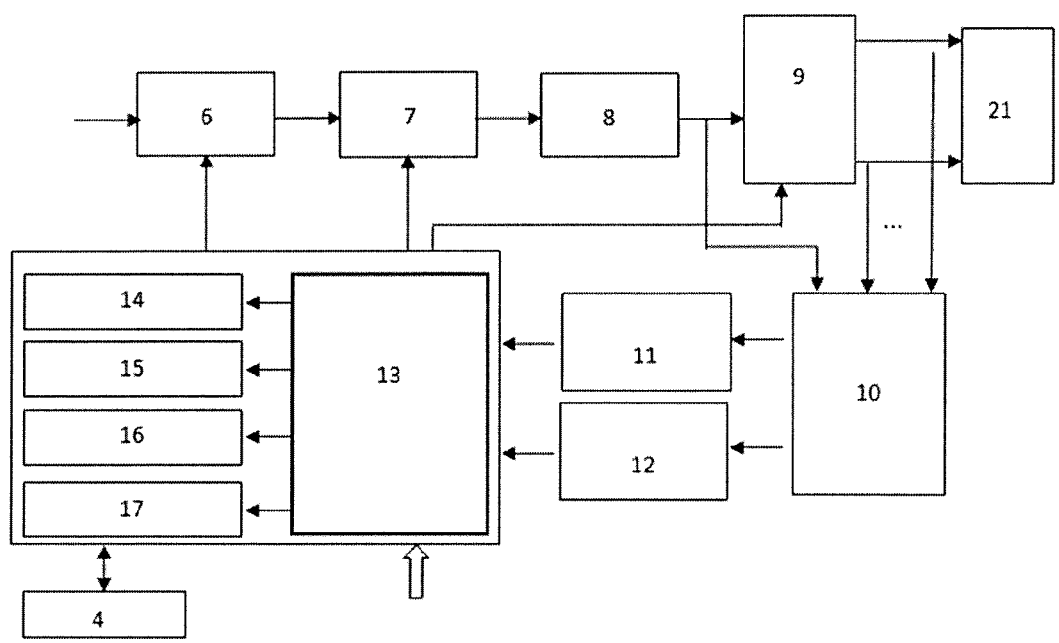
FIG. 2 is a structural diagram of the constant-current multiplex transmitter in the present invention.

The large-constant-current multiplex transmitter 1 is mainly composed of a transmission singlechip system, an H-bridge inverter circuit 6, a high-power high-precision multiplex driving module 9, a boosting module 7, a rectifying module 8, a current and voltage sampling module 10, an overvoltage and overcurrent protection module 11 and a data collecting module 12. As shown in FIG. 2, a 36 V power supply generates high-voltage constant current through the H-bridge inverter circuit 6, the boosting module 7 and the rectifying module 8, the rectifying module 8 is connected with the high-power high-precision multiplex driving module 9; the transmission singlechip system controls the H-bridge inverter circuit 6, the boosting module 7 and the high-power high-precision multiplex driving module 9 to detect current in a feedback circuit through the current and voltage sampling module 10 and controls the high-power high-precision multiplex driving module 9 to output 6 paths of adjustable constant current to the multiplex relay switch.

The transmission singlechip system comprises a transmission singlechip 13 with model number of MSP430F169, a digital display module 14, a clock module 15, a data storage module 16 and a data communication module 17, the transmission singlechip system mainly performs detection, display and control on switching value and analog quantity, the transmission singlechip 13 and a peripheral circuit power supply and constant current source are designed to be completely isolated, and parameters are set by a keyboard and are displayed in an LED manner. The transmission singlechip system outputs two paths of PWM modulation waveforms through a timer comparison output function of the transmission singlechip 13 and controls the H-bridge inverter circuit 6 to invert DC voltage through pulse width modulation (PWM) technology; the current and voltage sampling module 10 detects the current passing by the rectifying module 8, the transmission singlechip 13 adjusts the boosting module 7 to satisfy that the current passing by the rectifying module 8 is constant, meanwhile, the current and voltage sampling module 10 detects each path of current output by the high-power high-precision multiplex driving module 9, and the transmission singlechip 13 controls the high-power high-precision multiplex driving module 9 so as to adjust each path of current of the high-power high-precision multiplex driving module 9 to achieve a stable set value.

The high-power high-precision multiplex driving module 9 generates high voltage from 36V DC voltage output by a storage battery pack through the H-bridge inverter circuit 6 and the boosting module 7 and forms a multiplex negative feedback constant-current output loop through high-power MOSFET tubes so as to output 6 paths of constant large current, and meanwhile, the current and voltage sampling module 10 feeds back the current size of each path, so that the transmission singlechip 13 adjusts the high-power high-precision multiplex driving module 9 to output the number of the set power supply paths, power supply time and current size, the current set value is 0-2.0 A, and the step length is 0.01 A.

One end of the current and voltage sampling module 10 is used for respectively detecting current passing by the rectifying module 8 and multiplex current generated by the high-power high-precision multiplex driving module 9, and the other end of the current and voltage sampling module 10 is respectively connected with the current and voltage protection module 11 and the data collecting module 12 and is connected with the transmission singlechip 13. The current and voltage sampling module 10 is subjected to analog isolation by a Hall detecting circuit, meanwhile, the current and voltage sampling module 10 feeds back current size to the current and voltage protection module 11 to realize automatic protection on each branch of output voltage in multiplex output once exceeding 1000 V.

Figure 3:
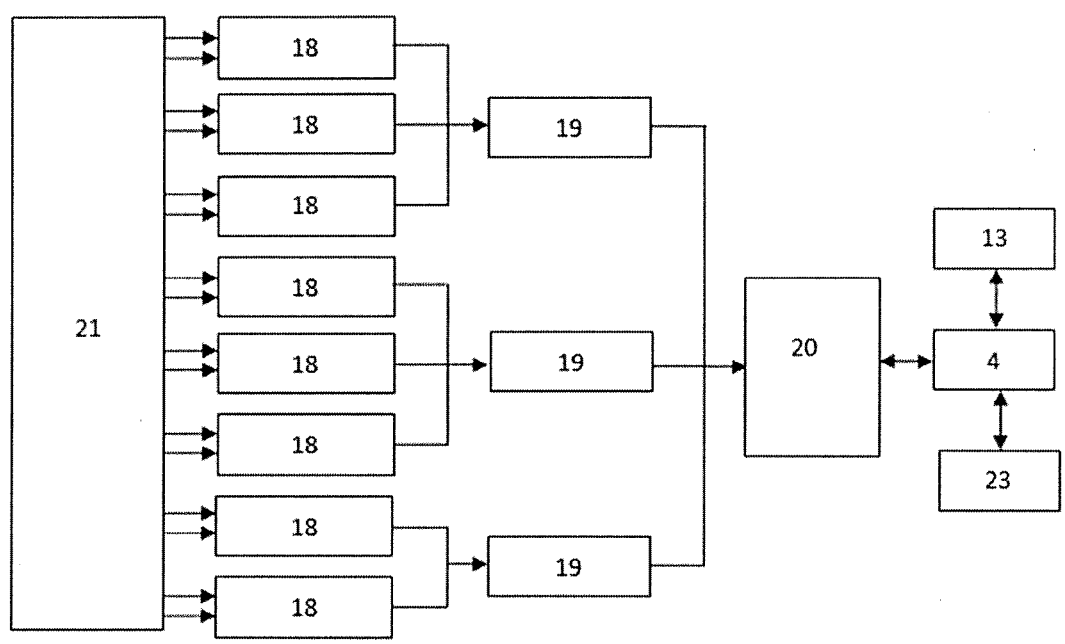
FIG. 3 is a structural diagram of the intelligent multichannel receiver in the present invention.

The intelligent multichannel receiver 2 comprises 8 parallel receiving modules 18, 3 multichannel 24-bit ADC converters 19 and a receiving singlechip 20, as shown in FIG. 3, a receiving signal enters the receiving singlechip 20 after passing by the receiving modules 18 and the multichannel 24-bit ADC converters 19 in sequence; the receiving singlechip 20 collects the data of each receiving module 18 and realizes control and information feedback with the industrial personal computer 4 through communication.

Figure 4:
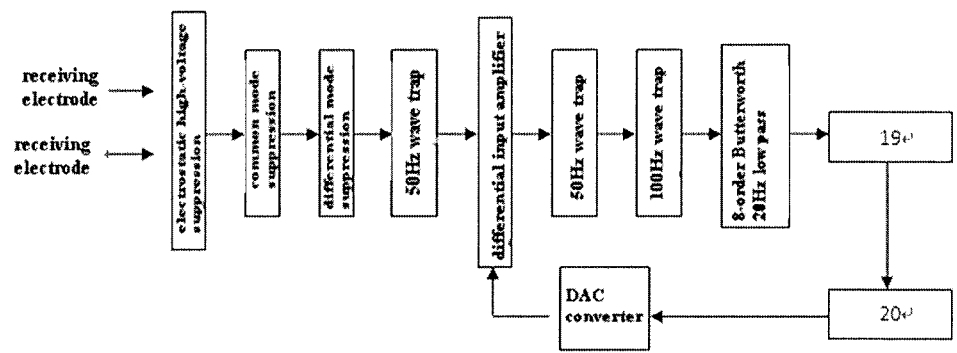
FIG. 4 is a schematic block diagram of receiving module hardware of the intelligent multichannel receiver in the present invention.

The receiving module 18 comprises an electrostatic high-voltage suppression circuit, a common mode suppression circuit, a differential mode suppression circuit, a first-stage 50 Hz trapper, a differential input amplifier, a second-stage 50 Hz trapper, a 100 Hz trapper and an B-order Butterworth 20 Hz low pass filter, which are connected in sequence, and meanwhile, the receiving singlechip 20 controls the differential input amplifier through a DAC zeroing circuit, and the schematic block diagram is as shown in FIG. 4.

The electrostatic high-voltage suppression circuit mainly absorbs static and surge shocks in the working environment to protect a rear end circuit; the common mode suppression circuit and the differential mode suppression circuit absorb input common mode and differential mode interference signals, two stages of 50 Hz trappers primarily absorb 50 Hz power frequency interference to ensure that the DC working point of the differential input amplifier does not drift with the interference signals; signals output by the differential input amplifier pass by the first-stage 50 Hz trapper and the 100 Hz trapper to fully suppress the interference of power frequency and power frequency harmonic waves; and the 8-order Butterworth low pass filter has a decrement of 40 dB each decade and ensures the smoothness of signals in the bandwidth. The ADC converter 19 inputs a bipolar signal, the maximal signal voltage is +/−15 V and the signal resolution of conversion output under each stage of gain can reach 24 bits. The DAC zeroing circuit is connected with the differential input amplifier, and the minimal zeroing voltage is +/−4.8 uV.

Figure 5:
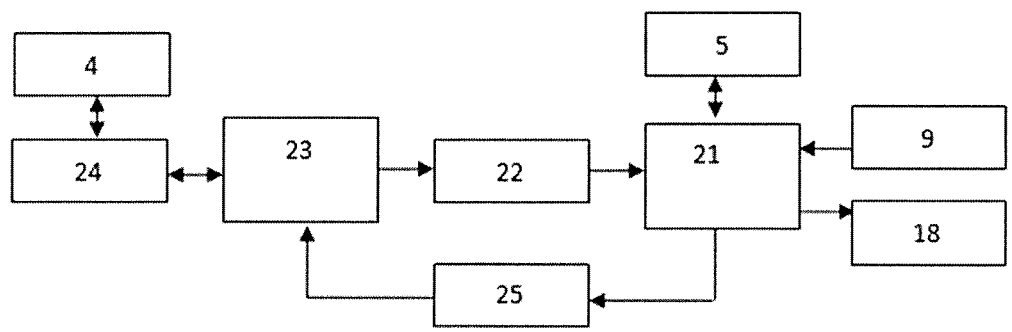
FIG. 5 is a structural diagram of the automatic multi-electrode switch in the present invention.

The automatic multi-electrode switch 3 is mainly composed of a multiplex relay switch 21, a decoding circuit 22, a converter singlechip 23, a communication module 24 and a voltage sampling circuit 25 and the like, as shown in FIG. 5. The industrial personal computer 4 is connected with the converter singlechip 23 through the communication module, the converter singlechip 23 is connected with the multiplex relay switch 21 through the decoding circuit 22, one end of the multiplex relay switch 21 is connected with 36 paths of electrodes, and the other end of the multiplex relay switch 21 is respectively connected with the high-power high-precision multiplex driving module 9 and the receiving module 18 through multiplex cables to perform conversion of four arrangements of Winner, dipole, differential and combined section, and only one second is needed to change the measuring point one time, thereby greatly saving manpower, material resources and time and improving the measuring precision and efficiency.

The multiplex relay switch 21 is a high-power relay, meanwhile, the voltage sampling circuit 25 is used for detecting the voltage of the high-power relay, and the voltage is fed back to the industrial personal computer 4 through the converter singlechip 23 so as to quickly switch the large transmission current to avoid burning of the relay due to over large load. The converter singlechip 23 controls the on/off of the multiplex relay switch 21 through an encoding circuit 22 according to a command sent by the industrial personal computer 4 to realize quick conversion of 36 paths of electrodes.

The industrial personal computer 4 comprises a signal recognition module, a signal processing module and a terminal display control module, the industrial personal computer 4 is connected with the large-constant-current multiplex transmitter 1 through communication and realizes signal control with the large-constant-current multiplex transmitter 1 through communication, and the industrial personal computer 4 performs final processing of digital signals to measure apparent resistivity, ground resistance, apparent polarizability, half-decay time and rate of induced polarization. The industrial personal computer 4 realizes control and information feedback with the intelligent multichannel receiver 2 through communication, is connected with the automatic multi-electrode switch 3 through communication, can set the parameters of the automatic multi-electrode switch 3, the large-constant-current multiplex transmitter 1 and the intelligent multichannel receiver 2, meanwhile, sends a control command on branch number and current size of each branch to the intelligent multichannel receiver 2 and the large-constant-current multiplex transmitter 1 to detect the voltage fed back by the automatic multi-electrode switch 3, processes a multiplex signal passing by the intelligent multichannel receiver 2, and processes the digital signals and displays on a terminal.

When the present invention operates, a scanning electrode array and the shielding electrodes are arranged on the tunnel face, so that the current of the source electrode nearly flows into the surrounding rock along the radial direction under the action of the shielding electrodes to obtain effective information in front of the tunnel face, the automatic multi-electrode switch 3, the intelligent multichannel receiver 2 and the large-constant-current multiplex transmitter I are adopted to quickly collect information in front of the tunnel face to obtain abundant data, geology interpretation is performed on an aquiferous body in front of the tunnel face through three-dimensional resistivity inversion imaging technology and water quantity estimation technology, and the current directivity is good, so that the side interference (for example, low-resistance aquiferous body and metal member) problem near the exploration line is effectively solved so as to reduce the background interference data and greatly improve the prediction precision and exploration distance.

Although, the specific embodiment of the present invention is described above in combination with the drawings, the protection scope of the present invention is not limited thereto, the skilled ones in the art should understand that various modifications or variations should still come into the protection scope of the present invention as long as these modifications or variations are made by the skilled ones in the art without creative work on the basis of the technical scheme of the present invention.

The invention claimed is:

1. Three-dimensional focusing induced polarization equipment for advanced geological prediction of a water inrush disaster source in underground engineering, comprising a constant-current multiplex transmitter, an intelligent multichannel receiver, an automatic multi-electrode switch, an industrial personal computer and an electrode system; the electrode system comprises an observation electrode array and shielding electrodes; the observation electrode array comprises a plurality of electrodes, the electrodes in the observation electrode array and the shielding electrodes are respectively connected with the automatic multi-electrode switch, the automatic multi-electrode switch is respectively connected with the constant-current multiplex transmitter and the intelligent multichannel receiver, and the constant-current multiplex transmitter, the intelligent multichannel receiver and the automatic multi-electrode switch respectively communicate with the industrial personal computer; the observation electrode array and the shielding electrodes are arranged on a tunnel excavation surface, any electrode in the observation electrode array is selected as a source electrode, the other electrodes are used as observation electrodes, the industrial personal computer controls the constant-current multiplex transmitter to transmit current of the same polarity to the shielding electrodes and the source electrode, so that the current of the source electrode is nearly directed straight ahead of the excavation surface under the action of the shielding electrodes; the observation electrodes are used for collecting scanning data and feeding back the scanning data to the industrial personal computer through the intelligent multichannel receiver; and the industrial personal computer controls the automatic multi-electrode switch to change the source electrode to perform the next cycle of measurement:

the constant-current multiplex transmitter comprises a transmission singlechip system, an inverter circuit, a multiplex driving module, a boosting module, a rectifying module, a current and voltage sampling module and a data collecting module; a power supply generates high-voltage constant current through the inverter circuit, the boosting module and the rectifying module, and the rectifying module is connected with the multiplex driving module; and the the transmission singlechip system controls the inverter circuit, the boosting module and the multiplex driving module to detect current in a feedback circuit through the current and voltage sampling module and controls the multiplex driving module to output adjustable multiplex constant current;

the intelligent multichannel receiver comprises multiple parallel receiving modules, multichannel ADC converters and receiving singlechips, which are connected in sequence, and a receiving signal enters the receiving singlechips after passing by the receiving modules and the ADC converters in sequence; the receiving singlechips collect the data of each receiving module and realize control and information feedback with the industrial personal computer through communication so as to perform final processing on digital signals;

the automatic multi-electrode switch comprises a multiplex relay switch, a decoding circuit, a converter singlechip, a communication module and a voltage sampling circuit, the industrial personal computer is connected with the converter singlechip through the communication module, the converter singlechip is connected with the multiplex relay switch through the decoding circuit, one end of the multiplex relay switch is connected with the electrode system, and the other end of the multiplex relay switch is connected with the constant-current multiplex transmitter and the intelligent multichannel receiver through multiplex cables; the multiplex relay switch is a high-power relay, meanwhile, the voltage sampling circuit is used for detecting the voltage of the high-power relay, and the voltage is fed back to the industrial personal computer through the converter singlechip so as to quickly switch the large transmission current; and the converter singlechip controls the on/off of the multiplex relay switch through an encoding circuit according to a command sent by the industrial personal computer to realize quick conversion of multiple electrodes.

2. The three-dimensional focusing induced polarization equipment for advanced geological prediction of a water inrush disaster source in underground engineering of claim 1, wherein the transmission singlechip system comprises a transmission singlechip, a digital display module, a clock module, a data storage module and a data communication module, the transmission singlechip system performs detection, display and control on switching value and analog quantity, and the transmission singlechip controls the inverter circuit to invert DC voltage; the current and voltage sampling module detects the current passing by the rectifying module, the transmission singlechip adjusts the boosting circuit to satisfy that the current passing by the rectifying module is constant, meanwhile, the current and voltage sampling module detects each path of current output by the multiplex driving module, and the transmission singlechip controls the multiplex driving module so as to adjust each path of current of the multiplex driving module to achieve a stable set value.

3. The three-dimensional focusing induced polarization equipment for advanced geological prediction of a water inrush disaster source in underground engineering of claim 1, wherein the multiplex driving module, which using the DC voltage through the inverter circuit and the boosting module produces high pressure, forms a multiplex negative feedback constant current output loop by using MOSFET so as to output multiplex constant large current.

4. The three-dimensional focusing induced polarization equipment for advanced geological prediction of a water inrush disaster source in underground engineering of claim 1, wherein one end of the current and voltage sampling module is used for respectively detecting current passing by the rectifying module and multiplex current generated by the multiplex driving module, and the other end of the current and voltage sampling module is connected with the transmission singlechip through the data collecting module.

5. The three-dimensional focusing induced polarization equipment for advanced geological prediction of a water inrush disaster source in underground engineering of claim 1, wherein the transmission singlechip system further comprises an overvoltage and overcurrent protection module, the overvoltage and overcurrent protection module is respectively connected with the current and voltage sampling module and the transmission singlechip, the current and voltage sampling module feeds back current size to the current and voltage protection module to achieve automatic protection on each branch of output voltage in multiplex output.

6. The three-dimensional focusing induced polarization equipment for advanced geological prediction of a water inrush disaster source in underground engineering of claim 1, wherein the receiving module comprises an electrostatic high-voltage suppression circuit, a common mode suppression circuit, a differential mode suppression circuit, a first-stage 50 Hz trapper, a differential input amplifier, a second-stage 50 Hz trapper, a 100 Hz trapper and an 8-order Butterworth 20 Hz low pass filter, which are connected in sequence, and meanwhile, the receiving singlechip controls the differential input amplifier through a DAC zeroing circuit.

7. The three-dimensional focusing induced polarization equipment for advanced geological prediction of a water inrush disaster source in underground engineering of claim 1, wherein the industrial personal computer comprises a signal recognition module, a signal processing module and a terminal display control module, the industrial personal computer is connected and communicated with the constant-current multiplex transmitter, which realizes control and information feedback, the industrial personal computer is connected and communicated with the automatic multi-electrode switch, can set the parameters of the automatic multi-electrode switch, the constant-current multiplex transmitter and the intelligent multichannel receiver, meanwhile, sends a control command on branch number and current size of each branch to the intelligent multichannel receiver and the constant-current multiplex transmitter to detect the voltage fed back by the automatic multi-electrode switch, processes a multiplex signal passing by the intelligent multichannel receiver, and processes the digital signals and displays on a terminal.

\* \* \* \* \*